G. C. WORTHINGTON.
PROPELLING AND BRAKE MECHANISM FOR POLYCYCLES.
APPLICATION FILED NOV. 17, 1910.
1,041,936.
Patented Oct. 22, 1912.
2 SHEETS—SHEET 1.
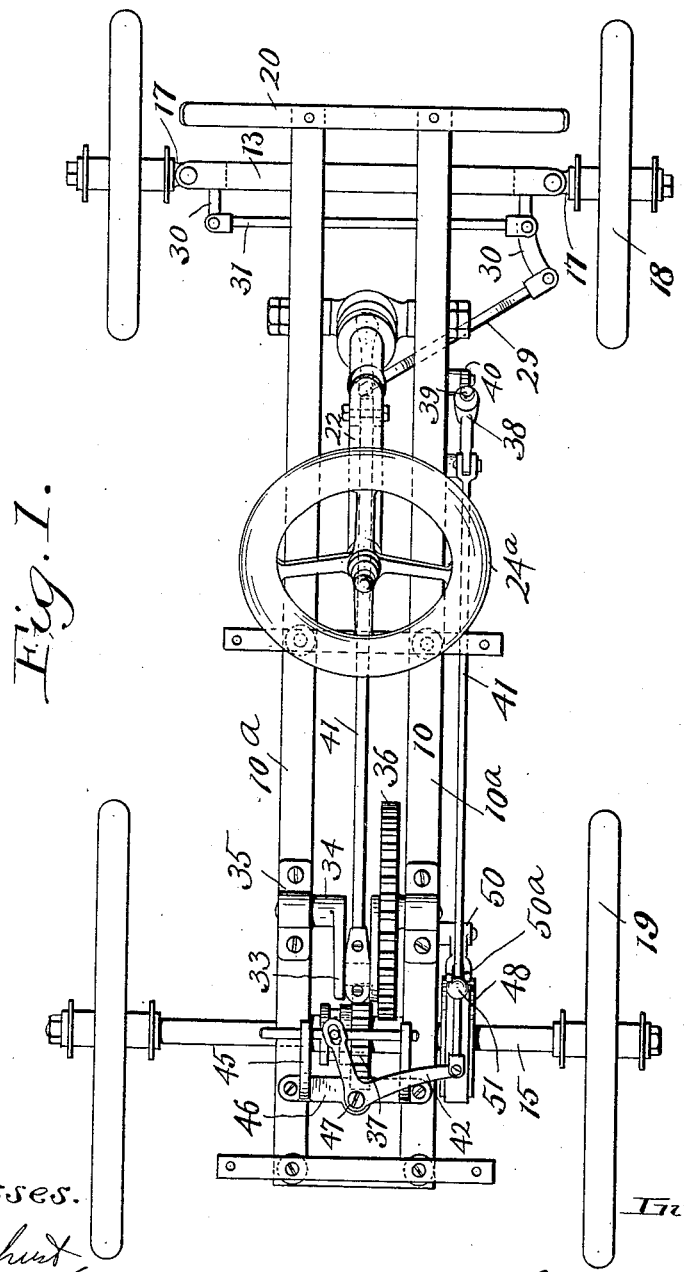
Fig. I.
Witnesses.
E. B. Filchrist
H. B. Sullivan
Inventor.
George C. Worthington
by Thurston & Kwis
Attys.

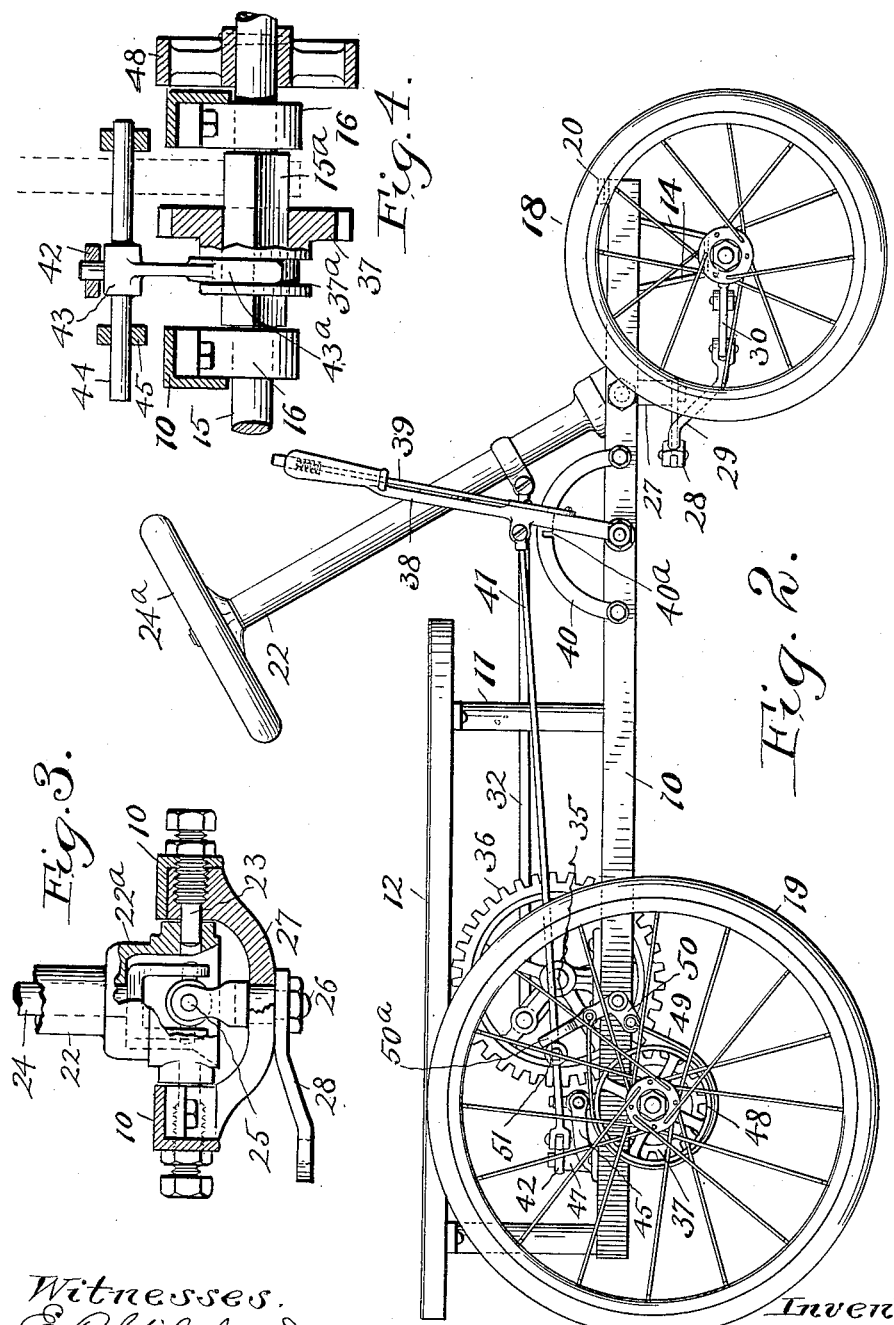

UNITED STATES PATENT OFFICE.

GEORGE C. WORTHINGTON, OF ELYRIA, OHIO, ASSIGNOR TO THE WORTHINGTON COMPANY, OF ELYRIA, OHIO, A CORPORATION OF OHIO.

PROPELLING AND BRAKE MECHANISM FOR POLYCYCLES.

1,041,936. Specification of Letters Patent. Patented Oct. 22, 1912.

Application filed November 17, 1910. Serial No. 592,783.

*To all whom it may concern:*

Be it known that I, GEORGE C. WORTHINGTON, a citizen of the United States, residing at Elyria, in the county of Lorain and State of Ohio, have invented a certain new and useful Improvement in Propelling and Brake Mechanism for Polycycles, of which the following is a full, clear, and exact description.

This invention relates to velocipedes of the type disclosed in my prior Patent No. 941,121,—Nov. 23, 1909, for velocipede, and including a frame having a seat for the occupant, steering and driving wheels at its front and rear thereof, and a combined steering and propelling or actuating device including a tubular member connected by a pitman and crank to the rear axle driving gears, and pivoted at its lower end so that it may be swung back and forth by the operator when occupying the seat, and a steering post arranged within the sleeve and provided at its upper end with a steering wheel, and at its lower end having a universal joint connection with a member connected to steering arms of the two front wheels.

The present invention is an improvement over the construction disclosed in the patent above referred to and has for one of its objects to provide novel and effective means including preferably a lever within convenient reach of the operator for connecting or disconnecting the driving mechanism including the rear axle and pivoted operating member so that the device may at the will of the operator be propelled by him or used for coasting purposes, together with means whereby when the driving mechanism is disconnected, the operator can by the same lever apply a brake to stop or check the speed of the velocipede.

A further object is to attain the above mentioned results by mechanism which is effective in operation, very simple, and consists of few parts, and still further the invention aims to provide a velocipede of the type specified and having the features above referred to, which is neat and attractive in appearance, inexpensive, easily operated and strong and durable.

My invention may be briefly summarized as consisting in certain novel details of construction and combinations and arrangements of parts which will be described in the specification and set forth in the appended claims.

In the two sheets of drawings, Figure 1 is a top plan view of a velocipede constructed in accordance with my invention, the seat being removed to show the parts beneath the same; Fig. 2 is a side view of the same; Fig. 3 is an enlarged detail sectional view taken through the frame forwardly of the combined steering and operating device, portions being broken away to show more clearly the construction and the manner of supporting and connecting the parts of this device; and Fig. 4 is an enlarged sectional view through the frame just at the rear of the rear axle, portions being broken away.

Referring now to the drawings, 10 represents a suitable frame which may be of any construction, but in this case includes two longitudinally extending side members 10ª which are preferably formed of angle sections. The side members of the frame are provided with upwardly extending vertical posts 11 on which is secured a flat seat 12 adapted to be occupied by the operator of the velocipede. At the forward end of the frame is a front axle 13 supported and fixed to the frame by arms or brackets 14, one of which is shown in Fig. 2, and near the rear end of the frame is a rear axle 15 which is journaled or rotatably supported in bearings 16 secured to the side members of the frame, as shown in Fig. 4. The front axle is provided at its ends with pivoted shaft sections or knuckles 17 on which are mounted two steering wheels 18, and the rear axle 15 has secured to its ends, driving wheels 19. Secured to the front end of the frame and extending beyond the side members thereof is a cross piece 20, which serves as a foot rest for the operator.

The velocipede is designed to be propelled by the operator when occupying the seat 12 by mechanism including a combined steering and propelling device, which includes a sleeve or tubular member 22 which is connected to the rear axle by suitable driving mechanism to be explained later, and at its lower end is provided with an inverted bell shaped portion 22ª pivotally supported on the inner ends of a pair of oppositely disposed screws 23 extending inwardly through and mounted in the opposite side members 10ª of the frame. The operating and steering device also includes a steering post 24 located within the sleeve and connected at its lower end by a universal joint 25 to a short vertically disposed shaft section 26, the pivotal connecting or supporting members of the universal joint 25 being between and in line with the supporting screws 23 of the sleeve 22. The shaft section 26 is supported in a bracket 27 extending between and secured to the side members 10$^a$ of the frame and at its lower end has secured thereto, an arm 28 which is connected by a rod 29 to steering arms 30 fixed to and extending rearwardly from the steering knuckles or shaft section 17 for the steering wheels, the two arms 30 being connected together by a rod 31 so as to move in unison.

Pivoted to the sleeve 22 at a suitable distance above its lower end is a pitman 32, the rear end of which is connected to a crank 33 on a shaft 34 which extends between the side members of the frame and is journaled in bearings 35 secured thereto. This shaft 34 has fixed thereto a gear 36 which is designed to engage with a smaller gear 37 which is slidably mounted upon a squared portion 15$^a$ of the rear axle 15, and is designed to be shifted into and out of engagement with the gear 36.

It will be seen from the mechanism so far described that when the gears 36 and 37 are in driving engagement and when the steering and propelling device 21 is swung back and forth by the operator who will grasp the steering wheel 24$^a$, the velocipede will be propelled or driven, and at the same time by simply turning the steering wheel 24$^a$, the velocipede can be readily steered or guided.

In order that the velocipede may be used for coasting purposes without requiring the swinging of the steering or propelling device 20, and in order that when used in this manner it will be under the control of the operator, I have provided means having the double function of causing the engagement and disengagement of the gears of the driving mechanism, and for also applying a friction brake to check or stop the vehicle, and this is accomplished by the following mechanism: Pivotally supported on one of the side members 10$^a$ of the frame and preferably on the right hand side of the same within convenient reach of the operator is a lever 38, which is provided with a latch or locking rod 39 adapted to coöperate with a locking segment 40 having a pair of notches 40$^a$ in either of which the lower end of the rod 39 may be inserted. This lever has pivotally connected thereto a rod 41 which extends rearwardly and at its rear end is pivotally connected to an arm of a horizontally movable bell crank 42 having a forwardly projecting arm which is loosely connected to a gear shifting member 43 having a yoke portion 43$^a$ which has sliding engagement within a groove in the hub 37$^a$ of the gear 37. The gear shifting member 43 is secured to a horizontal pin 44 adapted to be slid back and forth in a pair of arms 45 of a bracket 46 which is secured to the side members of the frame. This bracket also supports the bell crank 42 which is pivotally supported on the central part of the bracket 46 so as to swing in a horizontal plane, by means of a screw 47. The rear axle 15 is provided also at that side of the frame having the lever 38 with a brake wheel or drum 48, the periphery of which is adapted to be engaged by a flexible brake band 49, the ends of which are connected respectively to two arms of a bell crank 50 which is pivoted to the side member of the frame, as shown in Figs. 1 and 2, so as to swing in a vertical plane. One of the arms 50$^a$ of the bell crank extends upwardly and is forked at its upper end, the forked portion straddling the rod 41. In order that the lever and rod 41 may not only connect and disconnect the gears of a driving mechanism but may also apply or release the brake, the rod 41 has secured thereto by a pin or screw which permits its adjustment along the rod, an abutment 51, in this case in the form of a ball which, when the rod is shifted forwardly a suitable distance engages the forked arm 50$^a$ of the bell crank 50 so as to rock the latter and cause the brake to be applied. When the gears 36 and 37 are in driving engagement, the lever 38 is normally in its rearward position with the end of the latching rod 39 engaging in the rear slot 40$^a$ of the segment 40. When the gears are thus in engagement, the velocipede can be propelled in the manner previously stated. If, however, the velocipede is to be used for coasting purposes, or if for any other reason it is desired to break the driving connection between the steering and operating member 21 and the rear axle, the lever 38 is swung forwardly, the lower end of the rod 39 being first released from the rear notch by depressing said rod against the tension of a spring shown in Fig. 2. When the lever is swung forwardly until the end of the rod 39 engages in the forward notch of the segment 40, the gear 37 is shifted out of engagement with the gear 36, but when the lever is in this position, the brake is yet not applied. If, however, it is desired to apply the brake, the lever 38 is swung forwardly still farther until the ball 51 on the rod 41 engages and rocks the bell crank 50 and applies the brake. Thus, when the velocipede is used as a coaster, the operator can lock the lever 38 in a position such that the gears are out of engagement and the brake free or released, or by keeping his hand on the lever, and by moving the same backward or forward the desired amounts, he can regulate the speed of the velocipede or stop it entirely. This mechanism which serves both to connect and disconnect the driving mechanism and to apply or release the brake is very simple in construction, inasmuch as it consists of very few parts, is easily operated, and is very effective and reliable.

I do not desire to be confined to the exact details shown, as it is obvious that some changes can be made in the construction without departing from the spirit and scope of my invention.

Having thus described my invention, what I claim is:

1. The combination in a velocipede, a frame provided with front and rear axles having respectively steering and driving wheels, a propelling mechanism comprising a device adapted to be actuated by the occupant of the vehicle, and a transmission between said device and the rear axle, means for connecting and disconnecting the transmission with the rear axle, a brake connected with the rear axle, a lever for operating said brake, a manually operated lever, a rod directly connected with the means for connecting and disconnecting the transmission and the axle, an abutment carried by the rod and adapted to engage the brake lever to operate the brake after the rod has been moved to disconnect the transmission from the rear axle.

2. In combination in a velocipede, a frame provided with front and rear axles with front and rear wheels mounted thereon, a driving mechanism comprising a device adapted to be actuated by the occupant of the velocipede, transmitting mechanism connecting said device with the rear axle, a brake including a brake wheel on the rear axle, and a band adapted to engage the brake wheel, means for connecting and disconnecting the driving mechanism and the rear axle, said means including a pivoted lever, a rod connected at one end to said pivoted lever, a manually operated lever pivoted upon the frame and connected to said rod, a lever for operating said brake, an abutment carried by said rod and adapted to engage the brake lever when the manually operated lever is moved to disconnect the driving mechanism and the rear axle, and after such disconnection is effected.

In testimony whereof, I hereunto affix my signature in the presence of two witnesses.

GEORGE C. WORTHINGTON.

Witnesses:
P. S. WILLIAMS,
DORA A. NICHOLS.

---

Copies of this patent may be obtained for five cents each, by addressing the "Commissioner of Patents, Washington, D. C."